(No Model.) 4 Sheets—Sheet 1.
F. W. MORGAN & E. W. YOUNG.
MANUFACTURE OF PNEUMATIC TIRE TUBES.
No. 605,644. Patented June 14, 1898.
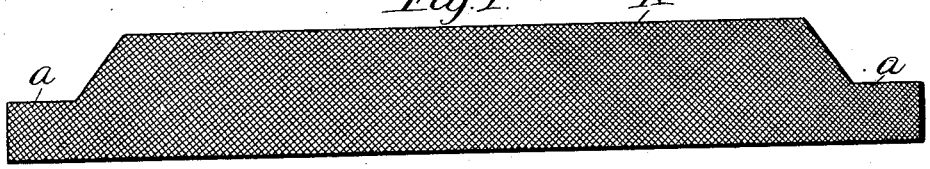
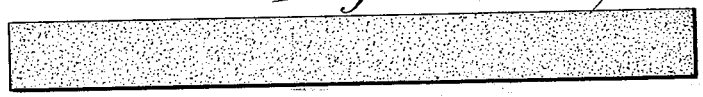
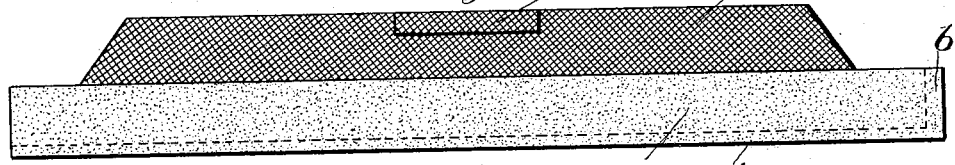
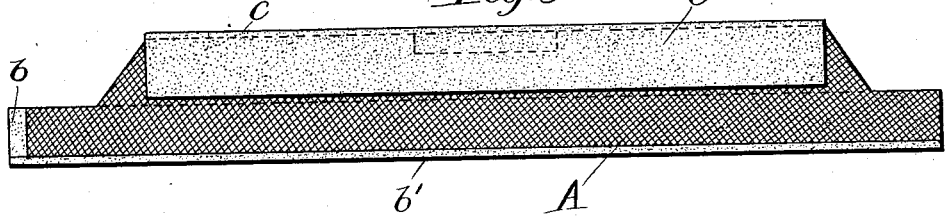
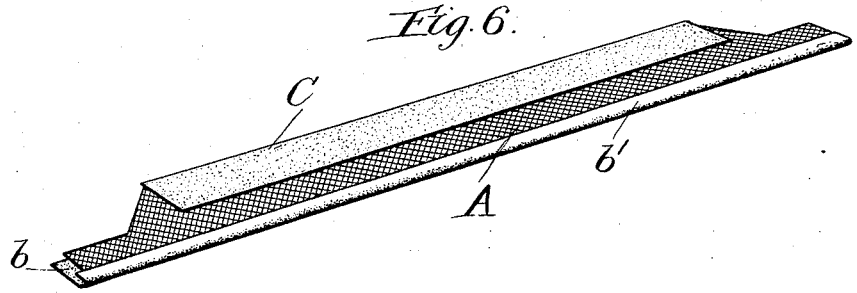
Witnesses:
A. F. Durand.
M. H. Wagner.
Inventors:
Fred W. Morgan.
Ernest W. Young
by Chas. J. Page Atty.

(No Model.) 4 Sheets—Sheet 2.
F. W. MORGAN & E. W. YOUNG.
MANUFACTURE OF PNEUMATIC TIRE TUBES.
No. 605,644. Patented June 14, 1898.
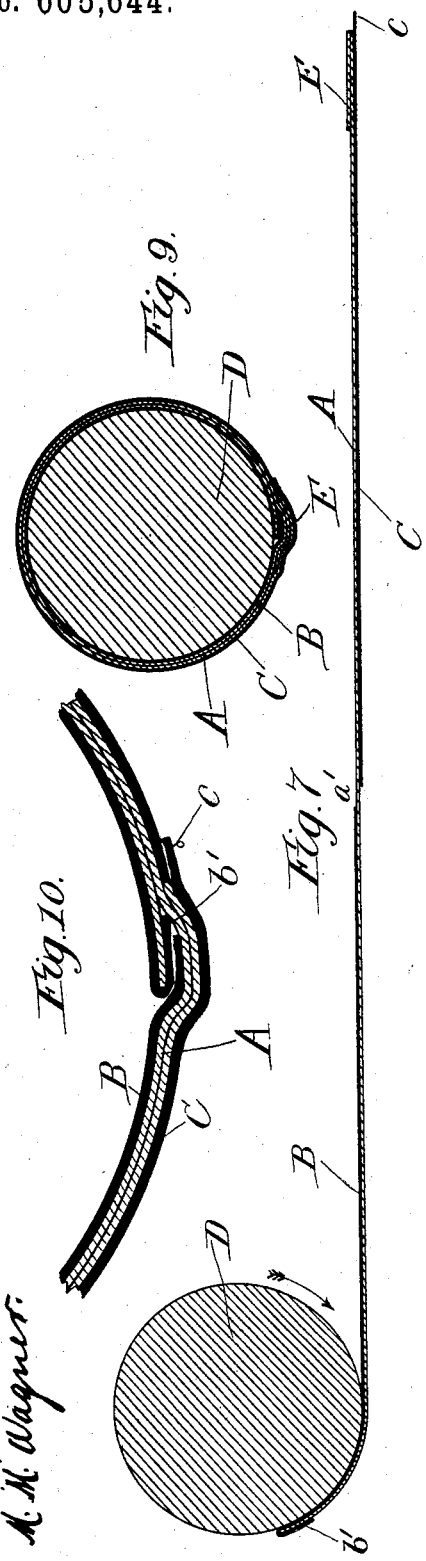
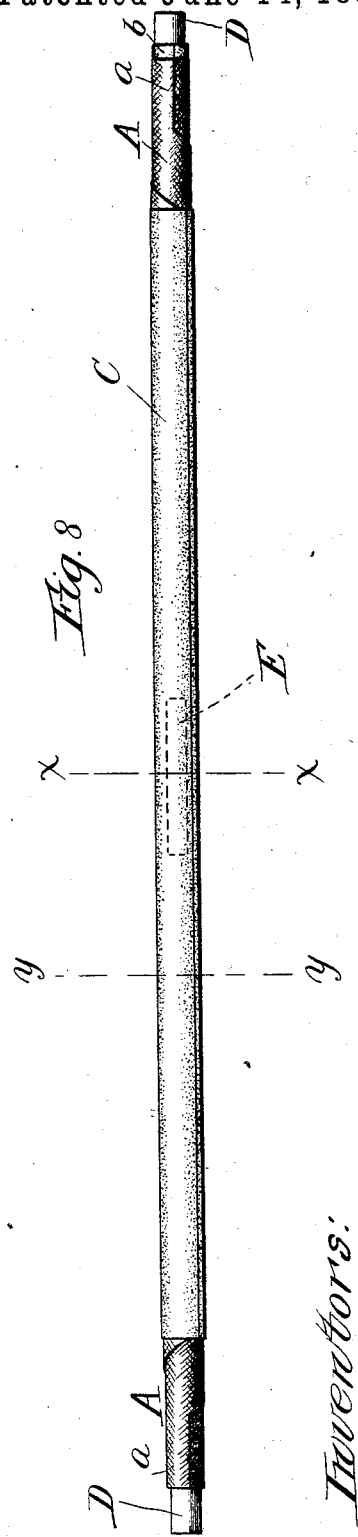

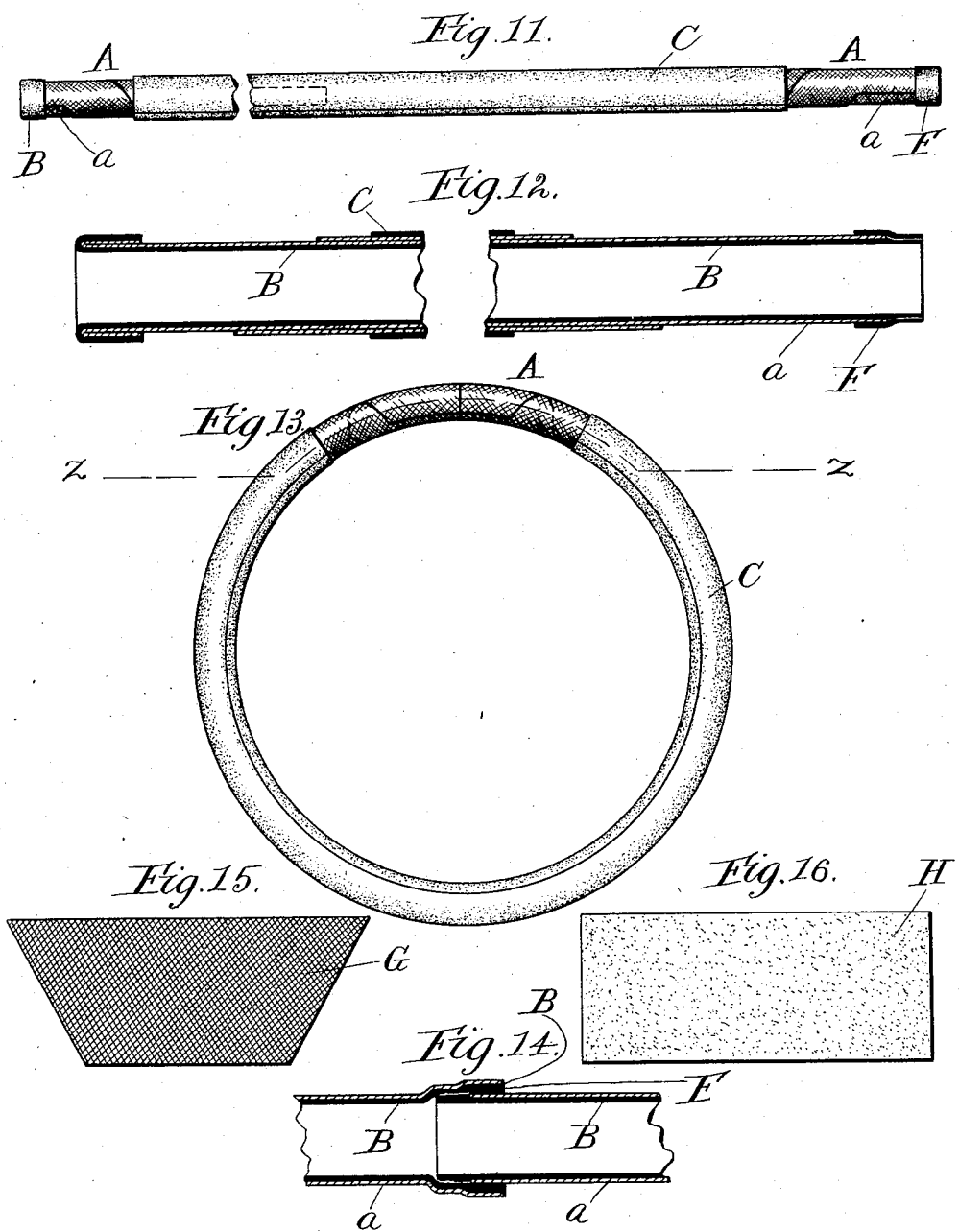

(No Model.) 4 Sheets—Sheet 4.

F. W. MORGAN & E. W. YOUNG.
MANUFACTURE OF PNEUMATIC TIRE TUBES.

No. 605,644. Patented June 14, 1898.

Witnesses.
A. F. Durand.
H. M. Wagner.

Inventors.
Fred W. Morgan.
Ernest W. Young.
by Chas. G. Page, Atty.

UNITED STATES PATENT OFFICE.

FRED W. MORGAN, OF CHICAGO, AND ERNEST W. YOUNG, OF AUSTIN, ILLINOIS, ASSIGNORS TO THE MORGAN & WRIGHT, OF CHICAGO, ILLINOIS.

MANUFACTURE OF PNEUMATIC-TIRE TUBES.

SPECIFICATION forming part of Letters Patent No. 605,644, dated June 14, 1898.

Application filed March 10, 1898. Serial No. 673,331. (No model.)

*To all whom it may concern:*

Be it known that we, FRED W. MORGAN, residing at Chicago, and ERNEST W. YOUNG, residing at Austin, in the county of Cook and State of Illinois, citizens of the United States, have invented a certain new and useful Improvement in the Manufacture of Pneumatic-Tire Tubes, of which the following is a specification.

The objects of our invention are to rapidly and economically produce pneumatic-tire tubes, and more particularly tire-tubes adapted as sheaths or casings for double-tube tires, having great endurance and a high degree of perfection, to avoid the defects incident to pneumatic-tire tubes molded upon mandrels, to avoid the slow process of knitting together the edges of a strip of textile fabric and strips of rubber as generally practiced, and to dispense with skilled labor and the expense attending the same.

To the attainment of the foregoing and other useful ends our invention consists in matters hereinafter set forth.

Figure 17:
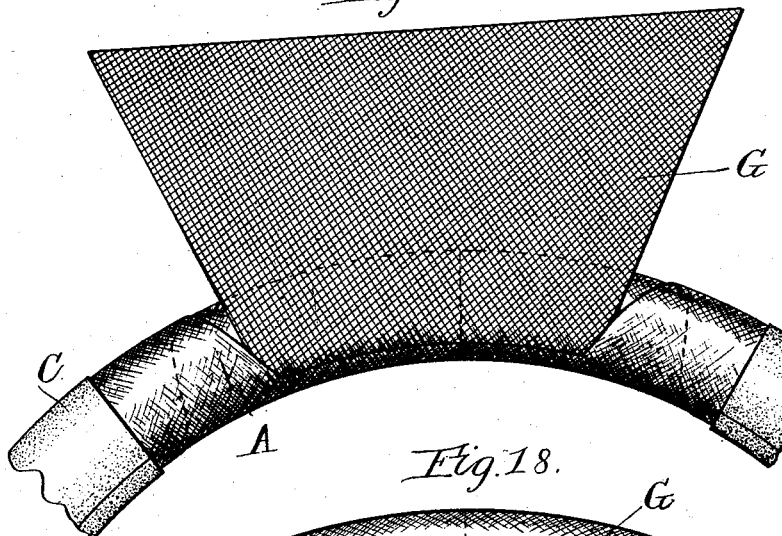
Figure 18:
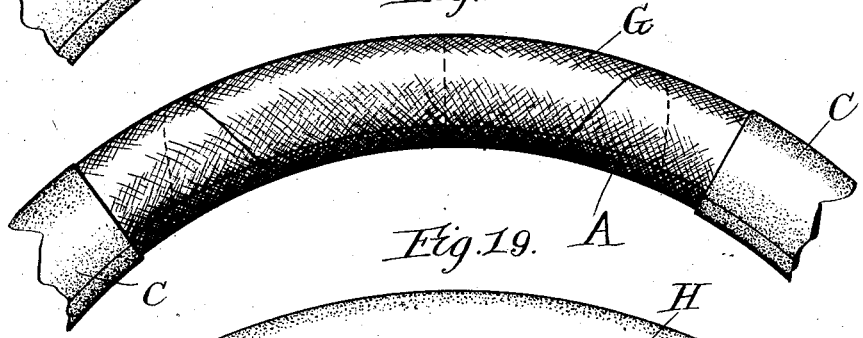
Figure 19:
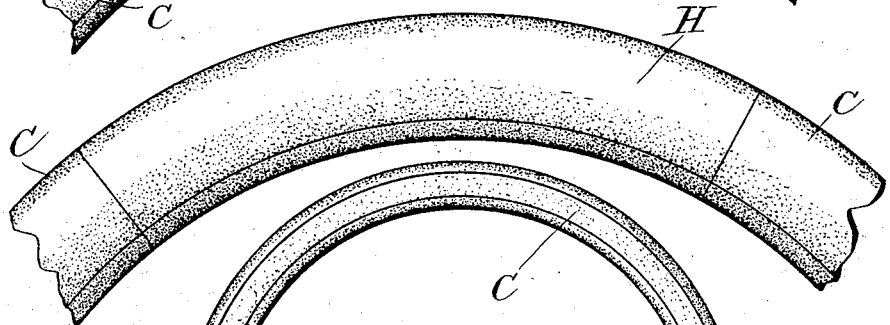
Figure 20:
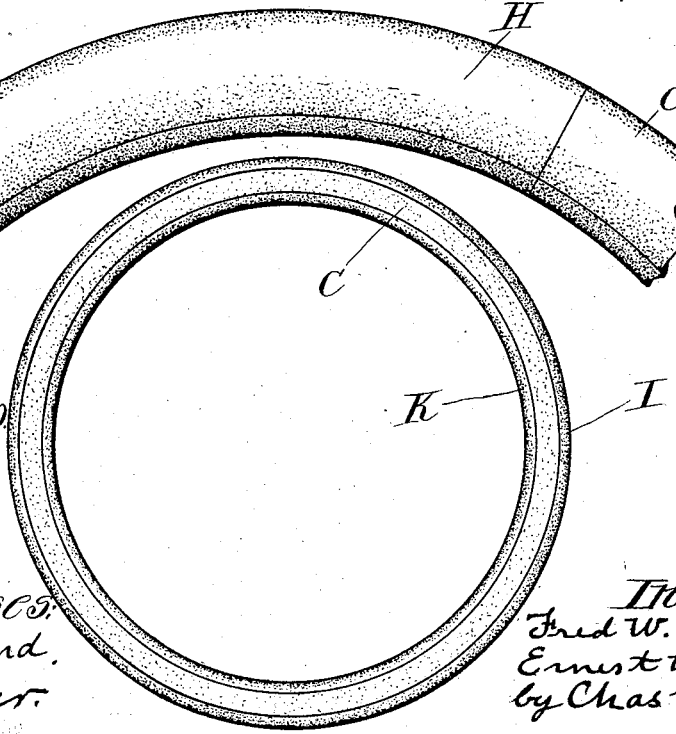

In the accompanying drawings, Figure 1 represents a strip or blank of textile material which is to be rolled into tubular form. Figs. 2 and 3 show strips of rubber which are to be applied to the strip of textile material. Fig. 4 illustrates the application of the strip of Fig. 2 to the strip of textile material. Fig. 5 illustrates the application of the strip of Fig. 3 to the strip of textile material. Fig. 6 is a perspective view of the composite fabric formed by the strips of Figs. 1, 2, and 3. Fig. 7 shows on a larger scale the way in which the composite fabric is rolled into tubular form by a pole or mandrel. Fig. 8 shows on a reduced scale the strip of composite fabric rolled into tubular form upon a pole or mandrel. Fig. 9 is a section through Fig. 8, on line $x\,x$, on an enlarged scale. Fig. 10 is a like view, on line $y\,y$, through a portion of the composite fabric. Fig. 11 shows on a smaller scale the tubular structure removed from the mandrel and broken away, one end of the tubular structure being turned back and the other end being provided with a band. Fig. 12 shows on a larger scale, in longitudinal central section, the end portions of the tubular structure of Fig. 11. Fig. 13 shows on a scale corresponding with Fig. 11 the tubular structure brought into annular form with its ends telescoped. Fig. 14 shows on a larger scale and in longitudinal section through Fig. 13, on line $z\,z$, the united or telescoped ends of the tubular structure. Fig. 15 shows a keystone strip. Fig. 16 shows a rubber strip. Fig. 17 illustrates the mode of applying the keystone strip of Fig. 15 to the tubular structure. Fig. 18 illustrates a portion of the tubular structure with the keystone strip applied. Fig. 19 is a like view showing the application of a strip such as illustrated by Fig. 16. Fig. 20 shows a completed tire-tube reinforced along its tread and base.

In carrying out our invention we prepare a strip A of textile material of a length and width suitable for forming a tubular structure corresponding in dimensions with the dimensions of the layer of textile material in a pneumatic tire, the preferred form of such strip or blank being best shown in Fig. 1, wherein the strip is contracted in width at its terminal portions $a$. We also prepare a couple of thin rubber strips B and C of unequal lengths, the former being somewhat larger than the latter. The strip A of textile material is spread out flat upon a suitable bed or table, and the long strip B of rubber is laid upon a portion of the strip of textile material, as in Fig. 4, wherein it will be seen that the strip of rubber is of a width to extend partially across the width of the main portion of the strip of textile material, although its terminal portions may and preferably do substantially correspond in width with the narrow terminal portions $a$ of the strip of textile material. When thus applied, the rubber strip B desirably extends beyond one end of the strip A of the textile material, as at $b$, and also has one of its longitudinal edge portions extended somewhat beyond one of the longitudinal edges of the strip of textile material, as at $b'$. In the main, however, the rubber strip B extends from one edge of the strip of textile material across a portion of the width of the latter. The whole— that is to say, the structure composed of the strips A and B—is then turned over and again spread out flat, and the short rubber strip C is then applied so as to extend across a portion of the width of the strip of textile material and also preferably extend somewhat beyond one of the longitudinal edges of the strip of textile material, as at c, Fig. 5. By such arrangement we provide a sheet of composite fabric composed of a layer of textile material A, provided on opposite sides with layers of rubber respectively extending over different portions of its width, so as to alternate in position relatively to the width of the layer of textile material—that is to say, one layer of rubber extends across a portion of the width of the strip or layer of textile material on one side of the latter, while the other layer of rubber extends across the remaining portion of the width of the strip or layer of textile material, but on the other side of the latter strip or layer. The free longitudinal edge portion b' of the rubber strip B can then be folded over upon the strip of textile material, as in Fig. 6, although this is not strictly necessary.

By thus forming a composite fabric composed of strips or layers of rubber and textile material, as hereinbefore described, such composite fabric can be quickly and readily rolled upon a straight pole or mandrel D, so as to form a tube composed of a couple of tubular layers of textile material arranged between two single layers of rubber. The composite fabric, prepared as aforesaid, is therefore laid upon a suitable bed or table and rolled into tubular form upon a mandrel D, the commencement of such step being illustrated in Fig. 7.

It will be understood from such illustration that the act of rolling the mandrel over the composite fabric causes the mandrel to pick up such fabric and that the mandrel is rolled over the fabric so as to roll up the latter into tubular form. It will also be seen that by rolling the mandrel in the direction of the arrow in Fig. 7 the rubber strip B will be caused to form the inner layer of the tubular structure, while the rubber strip C will be caused to form the outer layer, and that the strip of textile material will be rolled upon itself, so as to provide between such two layers of rubber a couple of layers or plies of textile material. The composite fabric can thus be quickly rolled without the exercise of special skill, thereby dispensing with the undesirably slow process and skilled labor heretofore incident to the common process of forming a flattened tubular structure by bringing together and manually knitting the edges of a fabric composed of layers of rubber and textile material. When the composite fabric hereinbefore described is being rolled by the mandrel into tubular form, the edge portion b' of the rubber strip B, whether left free or folded back upon the textile material, as illustrated, will be brought opposite a line between adjacent edges of the rubber strips B and C, as at the point a', Fig. 7, and hence will suitably supply the textile material with rubber along such line. After the composite fabric has been thus rolled by the straight mandrel into tubular form its general appearance will be substantially as in Fig. 8, it being observed that at one of the prior steps, preferably just before or after applying rubber strip B to the strip of textile material, as in Fig. 4, the textile fabric is preferably reinforced at a suitable point by a relatively small strip E of textile or like fabric which I term a "lacing-strip," for the reason that the completed tire can be split to a limited extent through such strip for the introduction of an inner air-tube and then laced up along such line of split. The tubular structure formed as aforesaid is then removed from the mandrel. After such removal one end of the tubular structure is turned back upon itself, as at the left-hand end of Fig. 11, and if desired a rubber band F can be applied to the opposite end of such tubular structure, although such band can be omitted. The ends of the tubular structure are then brought together and telescoped, the turned-back end portion hereinbefore referred to being then reversely turned, so as to bring it over the end provided with the band F, as illustrated in Fig. 14. The tubular structure, being now endless, is moderately inflated, as illustrated by Fig. 13, and then further completed by first wrapping about a portion of the exposed textile fabric a lozenge-shaped strip G of textile fabric termed a "keystone" strip, as in Fig. 17, and then covering the entire exposed surface of textile fabric between the ends of the outer tubular rubber layer C with a rubber strip H, which then practically forms a portion of such outer rubber layer. The tread side of the tire is then preferably reinforced or thickened by a rubber strip I, Fig. 20, and the annular tubular structure thus formed is then molded and vulcanized. In some cases a rubber strip K can be applied to the base, but for the sake of lightness we generally omit such strip.

The molding can be attained by inflating the tubular structure and wrapping it with suitable fabric and then subjecting the tire to vulcanization, or it can be introduced within a metal mold and there vulcanized. The inflation hereinbefore mentioned could be attained by primarily providing the tubular structure with an inflation-valve, but we prefer as a matter of further improvement to avoid such expense by injecting air through the medium of a hypodermic inflating-needle. After molding and vulcanization the vulcanized tire-tube is then deflated and split along the lacing-strip. An inner air-tube having a valve is then introduced, and the tire-tube is then laced up along the line of split.

By the foregoing method we are enabled to produce tires having great strength and endurance, to form them perfectly and uniformly, and to so form them in a highly economical and expeditious way and without specially skilled labor.

By suitably widening the strip or blank A the tire can of course be made with more than two plies of fabric, as will be obvious without further illustration.

What we claim as our invention is—

1. The within-described process of forming pneumatic-tire tubes consisting essentially in the following steps, to wit: forming a strip of textile material and strips of rubber severally of less width than the strip of textile material; producing a composite fabric by applying the strips of rubber respectively to opposite sides of the strip of textile material, and respectively over different portions of the width of the latter so as to relatively alternate in position thereon; rolling up this composite fabric into tubular form by rolling a pole or mandrel over such composite fabric spread out upon a bed or table; removing such tubular structure from the mandrel and uniting its ends; and then molding and vulcanizing the endless tubular structure so as to provide a pneumatic-tire tube.

2. The within-described process of forming pneumatic-tire tubes consisting essentially in the following steps, to wit: forming a strip of textile material and strips of rubber severally of less width than the strip of textile material; producing a composite fabric by applying the strips of rubber respectively to opposite sides of the strip of textile material, and respectively over different portions of the width of the latter so as to relatively alternate in position thereon; rolling up this composite fabric into tubular form by rolling a pole or mandrel over such composite fabric spread out upon a bed or table; removing such tubular structure from the mandrel and uniting its ends; inflating this endless tubular structure thus formed by hypodermically injecting air therein; and then molding and vulcanizing this inflated tubular structure, so as to produce a pneumatic-tire tube.

3. An endless, annular pneumatic-tire tube comprising in its structure and characterized by a strip of textile material having upon one side a thin rubber strip extending from one of its longitudinal edges part way across its width, and having upon its opposite side a strip of rubber extending from one of its longitudinal edges part way across its width, the composite fabric thus formed being rolled into tubular form with contiguous tubular plies of textile material arranged between inner and outer plies or layers of rubber provided by the rubber strips on opposite sides of the strip of textile material, and the whole molded and vulcanized, substantially as described.

FRED W. MORGAN.
ERNEST W. YOUNG.

Witnesses:
ARTHUR F. DURAND,
MARGARET M. WAGNER.